US012639352B1

(12) United States Patent
Shoham et al.

(10) Patent No.: US 12,639,352 B1
(45) Date of Patent: May 26, 2026

(54) SYSTEMS AND METHODS FOR LOAD-AWARE CONTEXT GATING FOR RETRIEVAL-AUGMENTED GENERATION

(71) Applicant: INTUIT INC., Mountain View, CA (US)

(72) Inventors: Ofir Ben Shoham, Tel Aviv (IL); Matan Vetzler, Tel Aviv (IL); Sagiv Antebi, Tel Aviv (IL); Shai Ardazi, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/418,773

(22) Filed: Dec. 12, 2025

(51) Int. Cl.
  *G06F 16/334* (2025.01)
  *G06N 3/0475* (2023.01)
  *G06N 3/048* (2023.01)

(52) U.S. Cl.
  CPC ....... *G06F 16/3344* (2019.01); *G06N 3/0475* (2023.01); *G06N 3/048* (2023.01)

(58) Field of Classification Search
  CPC ... G06F 16/3344; G06N 3/0475; G06N 3/048
  See application file for complete search history.

(56) References Cited

U.S. PATENT DOCUMENTS

| | | | |
|---|---|---|---|
| 2016/0294934 A1* | 10/2016 | Kirubanandam | ... H04L 41/0895 |
| 2022/0058433 A1* | 2/2022 | Han | ........................ G06F 40/30 |
| 2022/0385579 A1* | 12/2022 | Rangel Augusto | ... H04L 47/125 |
| 2025/0245271 A1* | 7/2025 | Ayed | ..................... G06F 40/284 |

OTHER PUBLICATIONS

Xiao et al. ("LAG: Logic-Augmented Generation from a Cartesian Perspective", Aug. 7, 2025, The Hong Kong Polytechnic University) (Year: 2025).*
Wang et al. ("TARG: Training-Free Adaptive Retrieval Gating for Efficient RAG", Nov. 12, 2025, Computer Science Department Stony Brook University) (Year: 2025).*

* cited by examiner

*Primary Examiner* — Imad Kassim
(74) *Attorney, Agent, or Firm* — DLA PIPER LLP US

(57) ABSTRACT

A system and method are provided for an improved retrieval augmented generation process.

18 Claims, 4 Drawing Sheets

200

201 — Receive user input to LLM

202 — Generate hidden state embedding vector

203 — Apply gate layer to hidden state embedding vector to generate gate probability 204 — Retrieve current system load 205 — Calculate RAG probability using current system load and gate probability 206 — Initiate RAG process based on RAG probability

SYSTEMS AND METHODS FOR LOAD-AWARE CONTEXT GATING FOR RETRIEVAL-AUGMENTED GENERATION

BACKGROUND OF THE DISCLOSURE

Retrieval-Augmented Generation (RAG) systems can enhance large language model (LLM) responses by retrieving relevant external context at query time. In multi-turn conversational systems, RAG architectures typically fetch and process external context on every user turn to provide comprehensive and up-to-date information. However, current RAG implementations face challenges related to computational efficiency and resource management. Many systems perform retrieval operations regardless of whether external context is actually needed for a given user turn, leading to increased inference time and unnecessary computational overhead. During periods of high system traffic, these indiscriminate retrieval operations can amplify server load and reduce overall system responsiveness. The inability to dynamically balance retrieval operations based on both content relevance and real-time system conditions is undesirable.

BRIEF DESCRIPTION OF THE FIGURES

Non-limiting and non-exhaustive examples are described with reference to the following figures.

Figure 1:
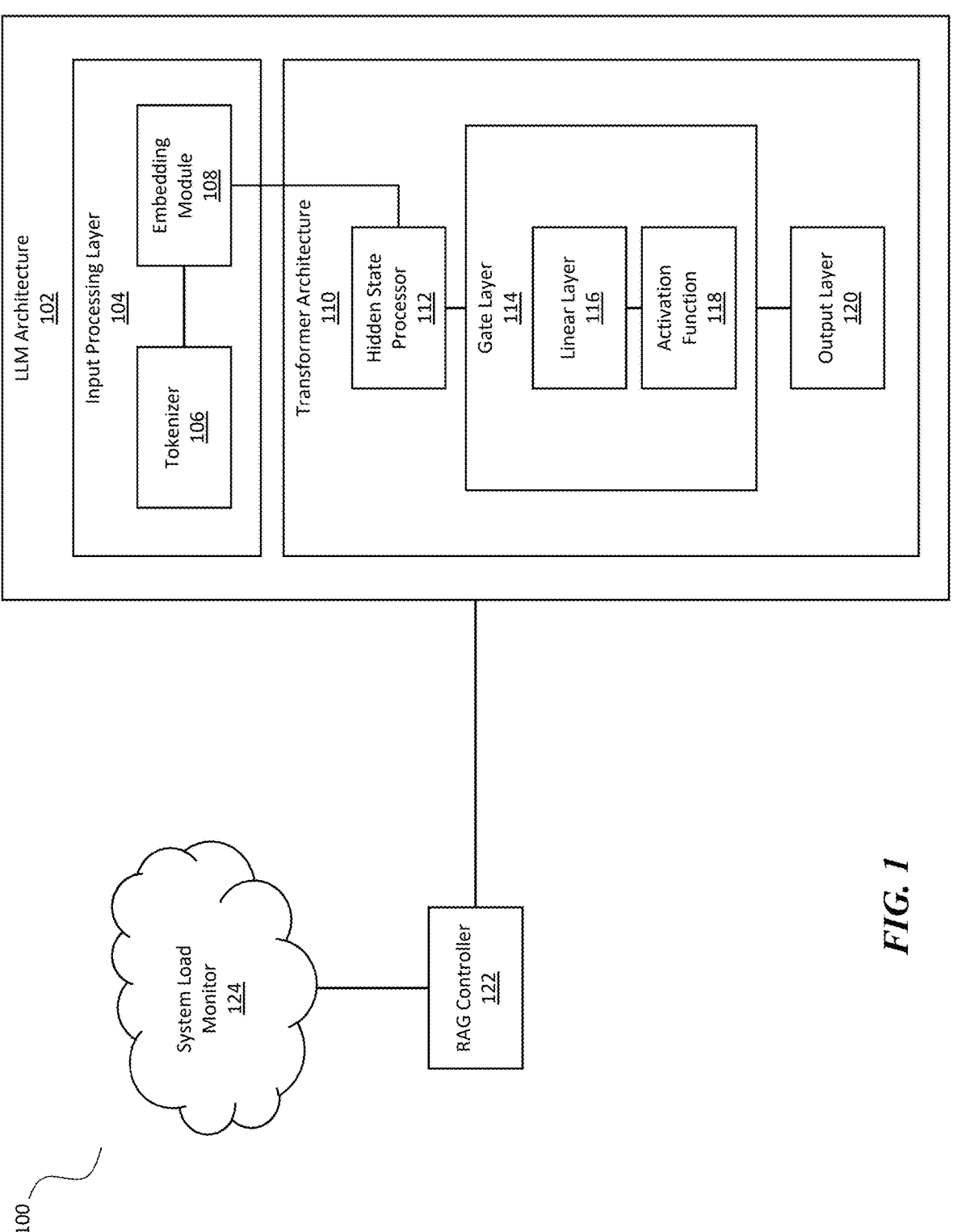
FIG. 1 illustrates a block diagram of an LLM system, according to aspects of the present disclosure.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the disclosure are directed to a load-aware context gating mechanism that can be integrated directly into an LLM architecture for dynamically controlling RAG operations. The system can address various computational inefficiencies that arise when RAG systems are utilized, such as when they perform external context retrieval on every user turn in multi-turn conversations, regardless of whether such retrieval is necessary for generating an appropriate response. The disclosed approach incorporates a gate layer within the transformer architecture of the LLM that analyzes the hidden state embedding of the user input to predict the base importance of performing retrieval for that particular turn. The gate layer can include a linear layer followed by an activation function that can generate a probability score indicating whether retrieval-augmented generation should be performed. The system can further adjust this base probability based on real-time system load metrics, such that higher system loads result in lower retrieval probabilities, thereby reducing unnecessary retrieval operations during peak traffic conditions.

The technical benefits of this approach include improved inference time through selective retrieval operations and enhanced resource utilization through dynamic load balancing. For example, by embedding the gating logic directly within the LLM architecture, the system can eliminate the need for separate classifier models or external importance prediction systems, which would otherwise introduce additional latency and computational overhead. The load-aware adjustment mechanism can enable the system to automatically scale retrieval operations based on current system capacity, reducing strain during high-traffic periods while maintaining full retrieval capabilities when system resources are available. In some embodiments, gate layer can be trained using binary cross entropy loss with labels derived from zero-shot predictions, allowing the system to learn when retrieval operations are most beneficial without requiring extensive manual labeling of training data.

The disclosed system can provide several technical benefits over conventional RAG implementations. The selective triggering of RAG operations based on turn-level importance predictions can reduce inference time by eliminating unnecessary retrieval operations that would otherwise be performed on every user interaction. The integration of the gating mechanism directly within the transformer architecture can eliminate the computational overhead associated with external classifier models or separate importance prediction systems, which would typically require additional forward passes and introduce latency penalties. The dynamic load balancing capability can enable smarter resource usage by automatically adjusting retrieval probabilities in response to real-time system conditions, allowing the system to maintain optimal performance during varying traffic loads. During peak traffic conditions, the load-aware adjustment mechanism can reduce the frequency of computationally expensive retrieval operations, thereby improving overall system responsiveness and preventing resource bottlenecks.

Referring to FIG. 1, a system 100 includes an LLM architecture 102, an input processing layer 104, a tokenizer 106, an embedding module 108, a transformer architecture 110, a hidden state processor 112, a gate layer 114, a linear layer 116, an activation function 118, an output layer 120, a RAG controller 122, and a system load monitor 124. The system 100 can dynamically control retrieval-augmented generation operations based on both user input analysis and real-time system load conditions. The system 100 can optimize computational resources by selectively triggering RAG processes when analysis indicates that external context retrieval would be beneficial for generating appropriate responses.

In some embodiments, the LLM architecture 102 can serve as the core processing component that handles user inputs and generates responses through various interconnected layers and modules. In some embodiments, the LLM architecture 102 can incorporate the gating mechanism directly within the transformer structure, eliminating the need for external classifier models that would otherwise introduce additional computational overhead and latency. For example, the LLM architecture 102 can process user inputs through multiple stages, from initial tokenization and embedding generation to final response output, while simultaneously evaluating the necessity of retrieval operations at each user turn.

In some embodiments, the input processing layer 104 can receive and process incoming user inputs to prepare them for subsequent analysis by the transformer architecture 110. The input processing layer 104 can handle various input formats and can convert raw user inputs into structured data that can be processed by downstream components within the LLM architecture 102. For example, input processing layer 104 can ensure that user inputs are properly formatted and prepared for tokenization and embedding generation processes.

In some embodiments, the tokenizer 106 can convert user inputs into discrete tokens that represent individual words, subwords, or characters depending on the tokenization strategy employed. For example, the tokenizer 106 can handle various text preprocessing tasks, including normalization, segmentation, and vocabulary mapping to ensure that user inputs are properly represented in a format suitable for the embedding module 108. The tokenizer 106 can maintain consistency in token representation across different user turns and conversation contexts.

In some embodiments, the embedding module 108 can generate numerical vector representations of the tokens produced by the tokenizer 106. For example, embedding module 108 can create dense vector embeddings that capture semantic and contextual information from the tokenized user input. In some embodiments, the embedding module 108 can produce embeddings that serve as input to the transformer architecture 110 for further processing and analysis.

In some embodiments, the transformer architecture 110 can process the embeddings from the input processing layer 104 and can generate hidden state representations that capture contextual information about the user input. For example, the transformer architecture 110 can incorporate the gate layer 114 as an integrated component, allowing for seamless evaluation of retrieval necessity without requiring separate model architectures. The transformer architecture 110 can maintain the standard transformer processing capabilities while adding the gating functionality for dynamic RAG control.

In some embodiments, the hidden state processor 112 can generate hidden state embedding vectors from the processed input received from the transformer architecture 110. For example, the hidden state processor 112 can produce representations that capture the semantic content and contextual information necessary for determining whether external retrieval operations would be beneficial for the current user turn. The hidden state processor 112 can provide these hidden state embeddings to the gate layer 114 for probability calculation.

In some embodiments, the gate layer 114 can analyze the hidden state embedding vectors to predict the base importance of performing retrieval operations for the current user turn. For example, the gate layer 114 can generate probability scores that indicate the likelihood that external context retrieval would improve response quality for the given input. The gate layer 114 can be trained using binary cross entropy loss with labels derived from zero-shot predictions to learn patterns that correlate with beneficial retrieval scenarios.

The linear layer 116 can apply learned weights and bias parameters to the hidden state embedding vectors received from the hidden state processor 112. The linear layer 116 can perform matrix multiplication operations that transform the hidden state representations into a format suitable for probability calculation. The linear layer 116 can be trained to identify features within the hidden state embeddings that correlate with scenarios where retrieval operations would be beneficial.

In some embodiments, the activation function 118 can process the output from the linear layer 116 to generate normalized probability values. In one example, the activation function 118 can be a sigmoid function that maps the linear layer output to a probability range between zero and one, though other activation functions can be employed depending on the specific implementation requirements. The activation function 118 can ensure that the gate probability values are properly bounded and interpretable as probability measures.

In some embodiments, the output layer 120 can produce the final response output from the LLM architecture 102 after processing the user input through the various transformer layers and components. For example, output layer 120 can generate responses that can incorporate retrieved context when the gating mechanism determines that retrieval operations should be performed. The output layer 120 can maintain response quality while benefiting from the selective retrieval approach implemented by the gating mechanism.

In some embodiments, the RAG controller 122 can receive gate probabilities from the gate layer 114 and can coordinate the retrieval operations based on the calculated probabilities and system load conditions. The RAG controller 122 can make final decisions about whether to initiate retrieval processes by combining the base gate probability with real-time system load metrics. The RAG controller 122 can manage the interface between the LLM architecture 102 and external knowledge sources or databases that provide context for retrieval-augmented generation.

In some embodiments, the system load monitor 124 can provide real-time metrics about current system resource utilization and operational capacity. The system load monitor 124 can collect information from various system components, including CPU usage, memory consumption, network bandwidth, and other performance indicators that reflect the current system state. The system load monitor 124 can supply load metrics to the RAG controller 122 for use in calculating adjusted retrieval probabilities that account for current system conditions.

Figure 2:
FIG. 2 illustrates a flowchart of a process for an improved RAG process, according to aspects of the present disclosure.
Figure 2:
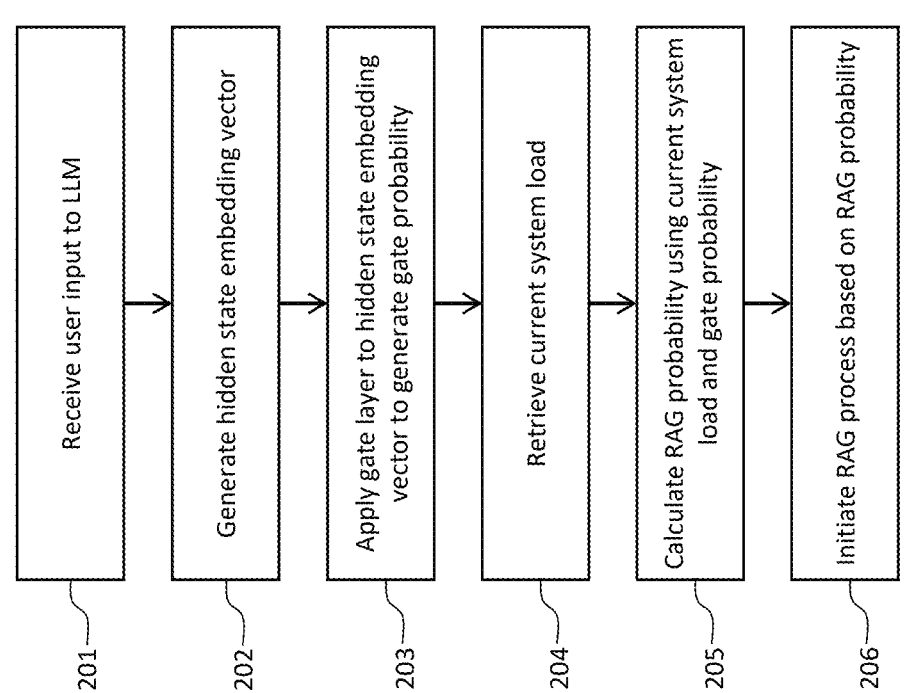

Referring to FIG. 2, a method 200 can be performed that dynamically controls retrieval-augmented generation operations in an LLM system by evaluating user input importance and adjusting retrieval decisions based on real-time system load conditions. At 201, the system 100 can receive a user input to the LLM architecture 102. In some embodiments, the input processing layer 104 can handle the incoming user input and can prepare the input for subsequent processing by downstream components within the LLM architecture 102. In some embodiments, the tokenizer 106 can process the user input to include special tokens for context ID in the tokenized user input, allowing the system 100 to maintain conversation context and track user interactions across multiple turns. In some embodiments, the tokenization process can refer to the LLM architecture 102's method for processing text and embeddings built on top of that. The text can be broken up into units/tokens and then embeddings can be generated from said tokens to provide richer semantic representations.

At 202, the embedding module 108 can generate a hidden state embedding vector from the user input received at 201. The transformer architecture 110 can process the embeddings to produce hidden state representations that capture contextual and semantic information about the user input. The hidden state processor 112 can generate the hidden state embedding vectors that serve as input to the gate layer 114 for probability calculation. In some embodiments, the method 200 can use fine-tuned parameters via adapters instead of frozen parameters for the user turn encoder, allowing for a more adaptive processing of user inputs while maintaining computational efficiency.

At 203, the gate layer 114 can apply processing to the hidden state embedding vector to generate a gate probability.

For example, the linear layer 116 can apply learned weights and bias parameters to the hidden state embedding vector, where applying the gate layer can include applying a bias to the hidden state embedding vector. In some embodiments, the input vector can be the output of the previous layer, not necessarily the user's original input. Each layer can transform the vector it receives, and that transformed output can become the input for the next layer. This chain of linear (and nonlinear) transformations can allow the model to learn complex patterns. The activation function 118 can process the output from the linear layer 116 to generate normalized probability values. In some embodiments, the activation function 118 can be a sigmoid function, though the method 200 can use activation functions other than sigmoid for the gate layer 114 depending on implementation requirements. The gate layer 114 can be integrated within the large language model as part of the transformer architecture 110 instead of operating as a separate linear layer, enabling seamless probability calculation without additional computational overhead.

In some embodiments, the gate layer 114 can be trained using binary cross entropy loss with labels derived from zero-shot predictions. The labels can be derived from zero-shot predictions generated by a second LLM, such as an o1 model that can generate zero-shot predictions to derive training labels for the gate layer 114. This training approach can enable the gate layer 114 to learn patterns that correlate with scenarios where retrieval operations would be beneficial without requiring extensive manual labeling of training data.

At 204, the system load monitor 124 can retrieve a system load metric. For example, the metric can reflect current system resource utilization and operational capacity. In some embodiments, the method 200 can retrieve the system load metric from an in-process monitoring API that provides real-time access to system performance indicators. Alternatively, the method 200 can retrieve the system load metric from an external metrics system, such as a Prometheus metrics system that can collect and provide comprehensive system monitoring data. The system load monitor 124 can sample the system load metric periodically with shared global state instead of once per inference call, or can sample the system load metric per each conversation to optimize resource monitoring frequency based on system requirements. In some embodiments, the load-retrieval process can include multiple types of system-level metrics that reflect real-time resource utilization and operational capacity. For example, some metrics can include CPU utilization, memory usage, disk I/O rates, network throughput, GPU load (if applicable), and latency or queue-depth indicators within the inference pipeline.

At 205, the RAG controller 122 can calculate a retrieval-augmented generation (RAG) probability using the gate probability generated at 203 and the system load retrieved at 204. The RAG probability can be calculated by multiplying the gate probability by a complement of the system load, such that higher system loads result in lower RAG probabilities. For example, the calculation can follow the formula: final probability=p (1−system_load), where p represents the gate probability from the gate layer 114 and system_load represents the normalized load metric from the system load monitor 124. In some embodiments, the method 200 can use multiplicative context gating by scaling retrieved context rather than just determining whether to initiate RAG, allowing for more granular control over the extent of context utilization based on both turn importance and system conditions.

At 206, the RAG controller 122 can initiate, based on the calculated RAG probability, a RAG process to generate a response to the user input. In some embodiments, initiating the RAG process can include initiating the RAG process in response to the calculated RAG probability exceeding a threshold value, allowing the system 100 to make binary decisions about retrieval operations based on the probability calculations. The RAG controller 122 can coordinate with external knowledge sources or databases to retrieve relevant context when the probability calculation indicates that retrieval operations would be beneficial for generating appropriate responses to the user input.

Although the description may describe specific examples of load-aware context gating mechanisms, variations to these examples are possible. For example, alternative activation functions can be employed beyond sigmoid functions, including tanh, ReLU, or learnable activation functions that adapt during training. Moreover, the system load retrieval can be implemented through various approaches, such as distributed monitoring systems, cloud-native metrics platforms, or custom load balancing algorithms that consider specific resource types like GPU utilization, memory bandwidth, or network latency. Sampling frequencies for system load metrics can vary from real-time continuous monitoring to periodic batch updates, or can be dynamically adjusted based on traffic patterns or system volatility.

In some embodiments, training approaches for the gate layer can include alternative loss functions such as focal loss for handling imbalanced datasets, reinforcement learning methods that optimize for downstream task performance, or multi-task learning frameworks that simultaneously train for retrieval prediction and response quality. The combination of gate probability with system load can follow different mathematical formulations, such as exponential decay functions, polynomial scaling, or learned combination functions that are trained to optimize system performance under various load conditions. In some embodiments, the RAG probability calculation can incorporate additional factors such as user priority levels, conversation history length, or domain-specific importance scores. For example, these variations can enable the system to be adapted for different deployment environments, computational constraints, and application-specific requirements while maintaining the core functionality of dynamic retrieval control based on both content analysis and system resource availability.

The disclosed load-aware context gating mechanism can provide substantial benefits for retrieval-augmented generation systems through multiple performance improvements. For example, the selective triggering of RAG operations based on turn-level importance predictions can significantly reduce inference time by eliminating unnecessary retrieval operations that would otherwise be performed on every user interaction, regardless of whether external context would improve response quality. In some embodiments, the integration of the gating mechanism directly within the transformer architecture can eliminate computational overhead associated with external classifier models or separate importance prediction systems, which would typically require additional forward passes and introduce latency penalties. Moreover, the dynamic load balancing capability can enable efficient resource utilization by automatically adjusting retrieval probabilities in response to real-time system conditions, allowing systems to maintain optimal performance during varying traffic loads while preventing resource bottlenecks during peak usage periods.

In some embodiments, the load-aware adjustment mechanism can provide improved system responsiveness by automatically scaling retrieval operations based on current system capacity, reducing strain during high-traffic periods while maintaining full retrieval capabilities when system resources are available. The training approach using binary cross entropy loss with labels derived from zero-shot predictions can enable the system to learn beneficial retrieval patterns without requiring extensive manual labeling of training data, reducing development overhead and enabling rapid deployment across different domains. The multiplicative context gating approach can provide granular control over context utilization, allowing systems to scale retrieved context based on both content importance and infrastructure constraints rather than making binary retrieval decisions. These combined benefits can result in systems that deliver consistent performance across varying operational conditions while optimizing computational resource usage and maintaining response quality through intelligent, adaptive retrieval control mechanisms.

The disclosed load-aware context gating mechanism can find application across various computational systems where balancing retrieval quality with computational efficiency and system load management is beneficial. Various conversational AI systems can utilize the approach to maintain responsive interactions during peak usage periods while preserving context retrieval capabilities when system resources permit, enabling scalable deployment across different user bases and traffic patterns. Multi-turn dialogue systems can benefit from the selective retrieval approach by reducing unnecessary context fetching operations that would otherwise occur on every conversational turn, thereby improving overall dialogue flow and reducing latency in extended conversations. In some embodiments, customer service chatbots can implement the mechanism to provide consistent response times during high-volume periods while maintaining access to knowledge bases and support documentation when system capacity allows for enhanced retrieval operations. In another example, virtual assistants can leverage the dynamic load balancing to optimize performance across varying query types and system conditions, ensuring responsive interactions for routine queries while enabling comprehensive knowledge retrieval for complex requests when computational resources are available.

A number of implementations have been described. Nevertheless, it will be understood that various modifications may be made without departing from the spirit and scope of the disclosure. Accordingly, other implementations are within the scope of the following claims.

Figure 3:
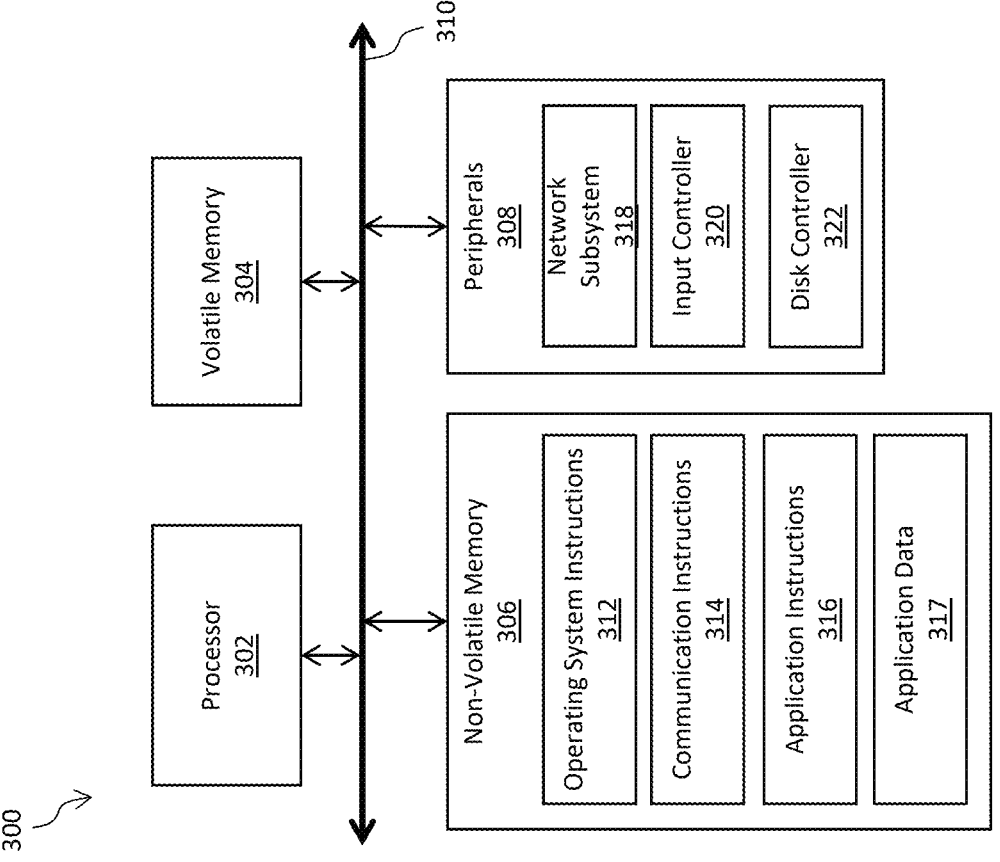
FIG. 3 is a diagram of an example computing device or server device.

FIG. 3 is a diagram of an example computing device or server device. Server 300 can implement various features and processes as described herein. Server 300 can be implemented on any electronic device that runs software applications derived from complied instructions, including without limitation personal computers, servers, smart phones, media players, electronic tablets, game consoles, email devices, etc. In some implementations, server 300 can include one or more processors 302, volatile memory 304, non-volatile memory 306, and one or more peripherals 308. These components can be interconnected by one or more computer buses 310.

Processor(s) 302 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 310 can be any known internal or external bus technology, including but not limited to ISA, EISA, PCI, PCI Express, USB, Serial ATA, or FireWire. Volatile memory 304 can include, for example, SDRAM. Processor 302 can receive instructions and data from a read-only memory or a random access memory or both. Essential elements of a computer can include a processor for executing instructions and one or more memories for storing instructions and data.

Non-volatile memory 306 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 306 can store various computer instructions including operating system instructions 312, communication instructions 314, application instructions 316, and application data 317. Operating system instructions 312 can include instructions for implementing an operating system (e.g., Mac OS®, Windows®, or Linux). The operating system can be multi-user, multiprocessing, multitasking, multithreading, real-time, and the like. Communication instructions 314 can include network communications instructions, for example, software for implementing communication protocols, such as TCP/IP, HTTP, Ethernet, telephony, etc. Application instructions 316 can include instructions for various applications. Application data 317 can include data corresponding to the applications.

Peripherals 308 can be included within server device 300 or operatively coupled to communicate with server device 300. Peripherals 308 can include, for example, network subsystem 318, input controller 320, and disk controller 322. Network subsystem 318 can include, for example, an Ethernet of WiFi adapter. Input controller 320 can be any known input device technology, including but not limited to a keyboard (including a virtual keyboard), mouse, track ball, and touch-sensitive pad or display. Disk controller 322 can include one or more mass storage devices for storing data files; such devices include magnetic disks, such as internal hard disks and removable disks; magneto-optical disks; and optical disks.

Figure 4:
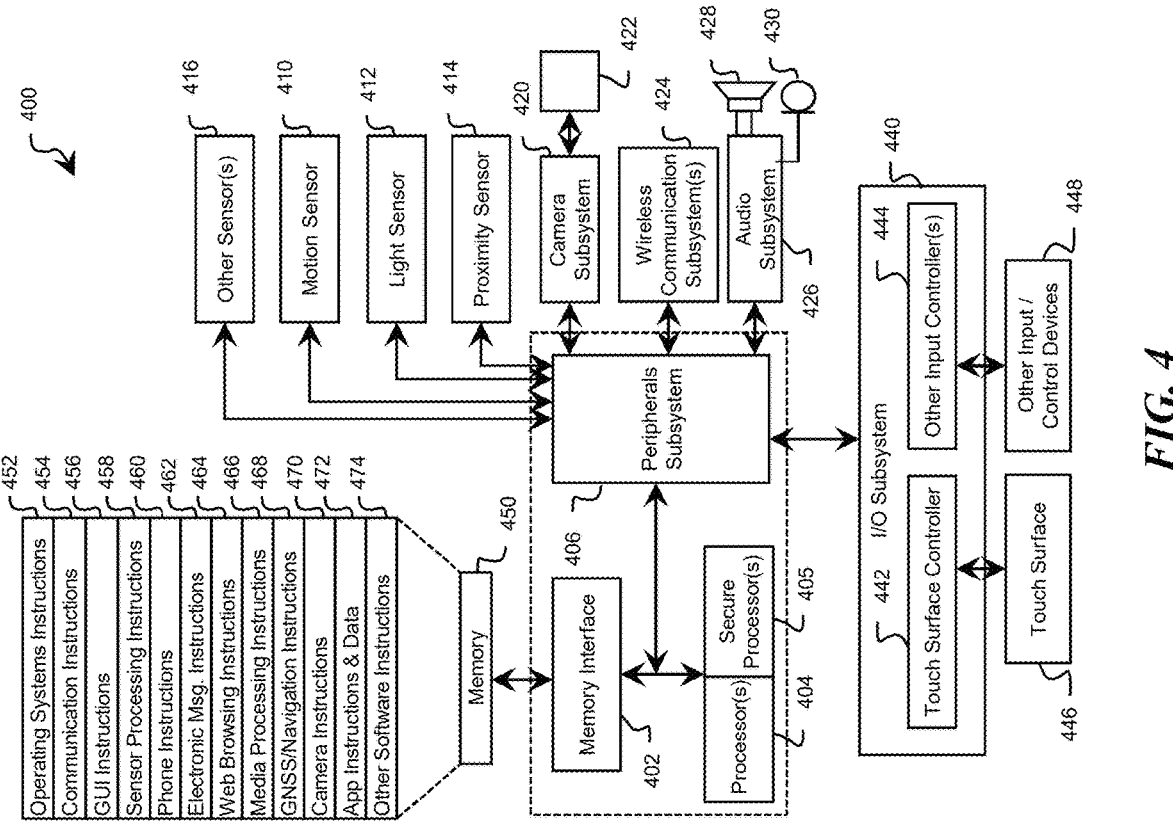
FIG. 4 is another example of a computing device.

FIG. 4 is another example of a computing device. The illustrative user device 400 can include a memory interface 402, one or more data processors, image processors, central processing units 404, and or secure processing units 405, and peripherals subsystem 406. Memory interface 402, one or more central processing units 404 and or secure processing units 405, and or peripherals subsystem 406 can be separate components or can be integrated in one or more integrated circuits. The various components in user device 400 can be coupled by one or more communication buses or signal lines.

Sensors, devices, and subsystems can be coupled to peripherals subsystem 406 to facilitate multiple functionalities. For example, motion sensor 410, light sensor 412, and proximity sensor 414 can be coupled to peripherals subsystem 406 to facilitate orientation, lighting, and proximity functions. Other sensors 416 can also be connected to peripherals subsystem 406, such as a global navigation satellite system (GNSS) (e.g., GPS receiver), a temperature sensor, a biometric sensor, magnetometer, or other sensing device, to facilitate related functionalities.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips. Camera subsystem 420 and optical sensor

422 can be used to collect images of a user to be used during authentication of a user, e.g., by performing facial recognition analysis.

Communication functions can be facilitated through one or more wired and or wireless communication subsystems 424, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 424. The specific design and implementation of communication subsystems 424 can depend on the communication network(s) over which the user device 400 is intended to operate. For example, user device 400 can include communication subsystems 424 designed to operate over a GSM network, a GPRS network, an EDGE network, a WiFi or WiMax network, and a Bluetooth™ network. For example, wireless communication subsystems 424 can include hosting protocols such that device 400 can be configured as a base station for other wireless devices and or to provide a WiFi service.

Audio subsystem 426 can be coupled to speaker 428 and microphone 430 to facilitate voice-enabled functions, such as speaker recognition, voice replication, digital recording, and telephony functions. Audio subsystem 426 can be configured to facilitate processing voice commands, voice-printing, and voice authentication, for example.

I/O subsystem 440 can include a touch-surface controller 442 and or other input controller(s) 444. Touch-surface controller 442 can be coupled to a touch-surface 446. Touch-surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 446.

The other input controller(s) 444 can be coupled to other input/control devices 448, such as one or more buttons, rocker switches, thumb-wheel, infrared port, USB port, and or a pointer device such as a stylus. The one or more buttons (not shown) can include an up/down button for volume control of speaker 428 and or microphone 430.

In some implementations, a pressing of the button for a first duration can disengage a lock of touch-surface 446; and a pressing of the button for a second duration that is longer than the first duration can turn power to user device 400 on or off. Pressing the button for a third duration can activate a voice control, or voice command, module that enables the user to speak commands into microphone 430 to cause the device to execute the spoken command. The user can customize a functionality of one or more of the buttons. Touch-surface 446 can, for example, also be used to implement virtual or soft buttons and or a keyboard.

In some implementations, user device 400 can present recorded audio and or video files, such as MP3, AAC, and MPEG files. In some implementations, user device 400 can include the functionality of an MP3 player, such as an iPod™. User device 400 can, therefore, include a 36-pin connector and or 8-pin connector that is compatible with the iPod. Other input/output and control devices can also be used.

Memory interface 402 can be coupled to memory 450. Memory 450 can include high-speed random access memory and or non-volatile memory, such as one or more magnetic disk storage devices, one or more optical storage devices, and or flash memory (e.g., NAND, NOR). Memory 450 can store an operating system 452, such as Darwin, RTXC, LINUX, UNIX, OS X, Windows, or an embedded operating system such as VxWorks.

Operating system 452 can include instructions for handling basic system services and for performing hardware dependent tasks. In some implementations, operating system 452 can be a kernel (e.g., UNIX kernel). In some implementations, operating system 452 can include instructions for performing voice authentication.

Memory 450 can also store communication instructions 454 to facilitate communicating with one or more additional devices, one or more computers and or one or more servers. Memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic messaging-related process and functions; web browsing instructions 464 to facilitate web browsing-related processes and functions; media processing instructions 466 to facilitate media processing-related functions and processes; GNSS/Navigation instructions 468 to facilitate GNSS and navigation-related processes and instructions; and or camera instructions 470 to facilitate camera-related processes and functions.

Memory 450 can store application (or "app") instructions and data 572, such as instructions for the apps described above in the context of FIGS. 1-2. Memory 450 can also store other software instructions 474 for various other software applications in place on device 400.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for dynamically controlling retrieval-augmented generation in a large language model system, comprising:

receiving a user input to a large language model (LLM);

generating a hidden state embedding vector from the user input;

applying a gate layer integrated within the large language model to the hidden state embedding vector to generate a gate probability;

retrieving a system load metric;

calculating a retrieval-augmented generation (RAG) probability using the gate probability and the system load;

wherein the RAG probability is calculated by multiplying the gate probability by a complement of the system load; and initiating, based on the calculated RAG probability, a RAG process to generate a response to the user input.

2. The computer-implemented method of claim 1, wherein applying the gate layer comprises applying a linear layer followed by an activation function.

3. The computer-implemented method of claim 2, wherein the activation function comprises a sigmoid function.

4. The computer-implemented method of claim 1, wherein the gate layer is trained using binary cross entropy loss with labels derived from zero-shot predictions.

5. The computer-implemented method of claim 4, wherein the labels are derived from zero-shot predictions generated by a second LLM.

6. The computer-implemented method of claim 1 comprising retrieving the system load metric from an in-process monitoring API.

7. The computer-implemented method of claim 1 comprising retrieving the system load metric from an external metrics system.

8. The computer-implemented method of claim 1, wherein initiating the RAG process comprises initiating the RAG process in response to the calculated RAG probability exceeding a threshold value.

9. The computer-implemented method of claim 1, wherein applying the gate later comprises applying a bias to the hidden state embedding vector.

10. A computing system comprising:

a processor; and a non-transitory computer-readable storage device storing computer-executable instructions, the instructions when executed by the processor cause the processor to perform operations comprising:

receiving a user input to a large language model (LLM);

generating a hidden state embedding vector from the user input;

applying a gate layer integrated within the large language model to the hidden state embedding vector to generate a gate probability;

retrieving a system load metric;

calculating a retrieval-augmented generation (RAG) probability using the gate probability and the system load;

wherein the RAG probability is calculated by multiplying the gate probability by a complement of the system load; and initiating, based on the calculated RAG probability, a RAG process to generate a response to the user input.

11. The computing system of claim 10, wherein applying the gate layer comprises applying a linear layer followed by an activation function.

12. The computing system of claim 11, wherein the activation function comprises a sigmoid function.

13. The computing system of claim 10, wherein the gate layer is trained using binary cross entropy loss with labels derived from zero-shot predictions.

14. The computing system of claim 13, wherein the labels are derived from zero-shot predictions generated by a second LLM.

15. The computing system of claim 10, wherein the operations comprise retrieving the system load metric from an in-process monitoring API.

16. The computing system of claim 10, wherein the operations comprise retrieving the system load metric from an external metrics system.

17. The computing system of claim 10, wherein initiating the RAG process comprises initiating the RAG process in response to the calculated RAG probability exceeding a threshold value.

18. The computing system of claim 10, wherein applying the gate later comprises applying a bias to the hidden state embedding vector.

* * * * *